United States Patent [19]

Barrett et al.

[11] 4,270,864
[45] * Jun. 2, 1981

[54] PHOTOACOUSTIC ROTATIONAL RAMAN SPECTROSCOPY

[75] Inventors: Joseph J. Barrett, Morris Plains; Gary A. West, Denville, both of N.J.

[73] Assignee: Allied Chemical Corporation, Morris Township, Morris County, N.J.

[*] Notice: The portion of the term of this patent subsequent to Mar. 7, 1995, has been disclaimed.

[21] Appl. No.: 20,380

[22] Filed: Mar. 14, 1979

[51] Int. Cl.³ .............................................. G01J 3/44
[52] U.S. Cl. .................................................. 356/301
[58] Field of Search ........................ 356/301; 250/343

[56] References Cited

U.S. PATENT DOCUMENTS

| 3,973,134 | 8/1976 | Begley et al. | 250/574 |
| 4,044,257 | 8/1977 | Kreuzer | 250/343 |
| 4,068,125 | 1/1978 | Bell | 250/343 |
| 4,077,719 | 3/1978 | Barrett et al. | 356/301 |
| 4,084,100 | 4/1978 | Begley et al. | 356/301 |
| 4,197,009 | 4/1980 | Berry et al. | 356/301 |

Primary Examiner—R. A. Rosenberger
Attorney, Agent, or Firm—Ernest D. Buff; Gerhard H. Fuchs; Robert A. Harman

[57] ABSTRACT

A method and apparatus for spectroscopic material analysis are provided. Two coherent beams of monochromatic radiation are directed through a sample of material. A tuning mechanism adjusts the frequency difference between the radiation beams to equal substantially the rotational frequency of a preselected constituent of the material. Molecular energy of a preselected constituent of the material is increased, thereby producing a detectable signal in the form of a pressure wave. The signal is received by a detecting mechanism which indicates the magnitude thereof.

14 Claims, 6 Drawing Figures

PHOTOACOUSTIC ROTATIONAL RAMAN SPECTROSCOPY

DESCRIPTION

1. Background of the Invention

This invention relates to the field of spectroscopy and more particularly to a method and apparatus in which two coherent beams of monochromatic light are transmitted through a sample of material at a frequency differential correlated with the rotational frequency of a constituent to detect and quantitatively measure the constituent.

2. Description of the Prior Art

In the apparatus used for spectroscopic material analysis, a modulated beam of infrared radiation having an emission spectrum embracing the absorption spectrum of the gas to be analyzed is directed through an optoacoustic cell containing the gas. Energy absorbed from the beam by the gaseous material heats the gas, thereby producing an acoustic wave. The latter is detected by a microphone in contact with the gas and converted to an electrical signal that is a function of the infrared radiation wavelength to provide an absorption spectrum of the gas.

One of the major problems with such apparatus is its unsuitability for universal analysis of minute quantities of gaseous constituents. The frequency of high power infrared radiation required for acceptable detection sensitivity is varied over a narrow range that does not embrace the absorption spectra of many gases. Another problem with such apparatus is the difficulty of fine tuning the infrared radiation beam. The infrared radiation frequency cannot be easily tuned to match absorption line frequency of the gas being analyzed, with the result that the absorption efficiency, and hence the detection sensitivity of the apparatus, is reduced. To alleviate such problems, it has been necessary to provide the apparatus with highly sensitive forms and combination of detectors, filters, control systems and the like, which are relatively expensive.

SUMMARY OF THE INVENTION

The present invention provides apparatus having increased sensitivity for spectroscopic material analysis. The apparatus has radiation source means for generating two coherent beams of monochromatic radiation. Such radiation source means has a tuning means associated therewith for adjusting the frequency difference between said beams of radiation to equal substantially the rotational frequency of a preselected constituent of the material. A projecting means is provided for directing the beams of radiation through the material to increase molecular energy of a proselected constituent thereof and thereby produce a detectable signal in the form of a pressure wave. The signal is received by a detecting means, which indicates the magnitude thereof.

Further, the invention provides a method for spectroscopically analyzing material comprising the steps of generating two coherent beams of monochromatic radiation; adjusting the frequency difference between the beams of radiation to equal substantially the rotational frequency of a preselected constituent of the material; directing the beams of radiation through the material to produce a detectable signal in the form of a pressure wave; and indicating the magnitude of the signal.

Several known tuning means may be adapted for use with the above apparatus. Preferably, the tuning means comprises a pair of high resolution diffraction gratings adjusted to transmit the two monochromatic light beams at a frequency differential correlated with the rotational frequency of a molecular species of the gaseous material. This condition is obtained when $\omega_1 - \omega_2 = \omega_R$ where $\omega_1$ and $\omega_2$ represent, respectively, the frequencies of the two coherent beams of monochromatic radiation and $\omega_R$ is the rotational frequency of the molecular species. For a given molecular species, the rotational spectral components exist at a unique set of frequencies. Each of these spectral components can be excited selectively to increase significantly the molecular internal energy (e.g., rotational energy) of the molecular species. Due to molecular collisions of the preselected species with like species or different constituents of the gaseous material, molecular energy transfer occurs, thereby producing a detectable signal in the form of a pressure wave. Identification of the species having a particular set of rotational spectral components is made positively when pressure waves are detected for excitation corresponding to several spectral components of the species.

The frequency range for the rotational spectral components of a given species is very small. Thus, the entire rotational spectrum can be rapidly scanned at low cost using electronic instrumentation and a single radiation source. Advantageously, the detected signal is derived from a rotational spectral component of the species, the intensity of which is considerably greater than that of the species vibrational spectral components. Accordingly, the intensity of the detectable signal, and hence the accuracy of the apparatus, is far greater than that obtained by apparatus wherein the detectable signal comprises coherently generated vibrational Raman spectral components of gaseous material.

BRIEF DESCRIPTION OF THE DRAWINGS

The invention will be more fully understood and further advantages will become apparent when reference is made to the following detailed description of the preferred embodiments of the invention and the accompanying drawings in which.

DESCRIPTION OF THE PREFERRED EMBODIMENTS

Radiation capable of exciting rotational states is found in each of the visible, infrared and ultraviolet frequency regions. As a consequence, the invention will function with radiation having a relatively wide range of frequencies. For illustrative purposes, the invention is described in connection with method and apparatus for exciting rotational spectral components of gaseous material with radiation from the visible frequency region.

When applied in this manner, the invention is particularly suited to detect and to measure quantitatively minor constituents of a gaseous material such as air. It will be readily appreciated that the invention can be practiced using radiation from any of the foregoing frequency regions, and that it can be employed for similar and yet diversified uses, such as the analysis of vibration-rotation spectra, the determination of molecular gas constants and the like.

Figure 1:
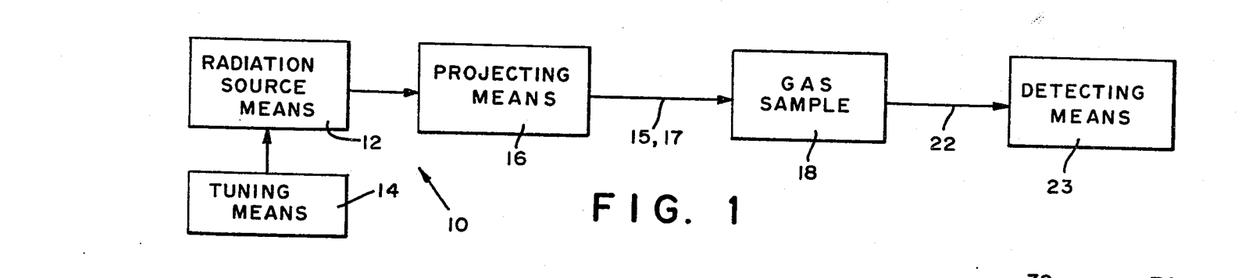
FIG. 1 is a block diagram showing apparatus for spectroscopic gas analysis.

Referring to FIG. 1 of the drawings, there is shown preferred apparatus for spectroscopic gas analysis. The apparatus, shown generally at 10, has radiation source means 12 for generating two coherent beams 15, 17 of monochromatic radiation. The radiation source means 12 has associated therewith a tuning means 14 for adjusting the frequency difference between the beams of radiation to equal substantially the rotational frequency of a preselected constituent of material. A projecting means 16 is provided for directing the beams of radiation 15, 17 through gaseous material in compartment 18 to increase molecular internal energy (e.g., vibrational and rotational energy) of a preselected species of the gaseous material. Due to molecular collisions of the preselected species with like species or different constituents of the gaseous material, molecular energy transfer occurs, thereby producing a detectable signal 22 in the form of a pressure wave. The molecular energy transfer is typically in the form of a vibrational to translational transfer, but may be in the form of rotational to translational transfer, electronic to translation energy transfer, a hybrid of vibrational and rotational to translational energy transfer and the like. A detecting means 24, adapted to measure the pressure wave, indicates the magnitude thereof.

Figure 2:
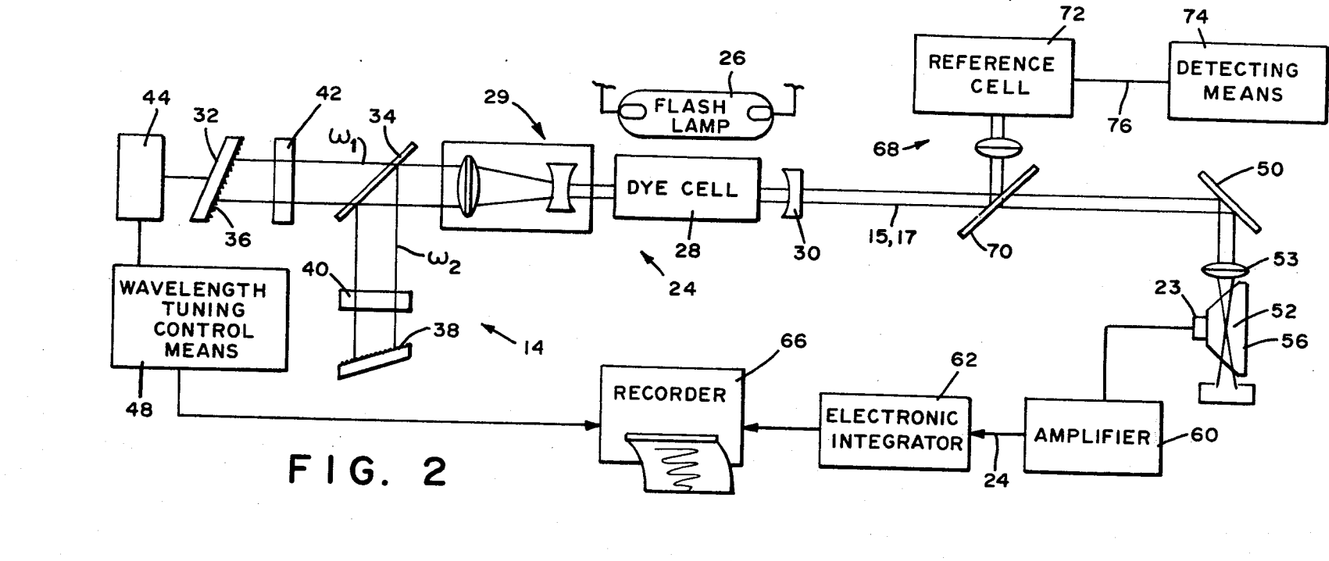
FIG. 2 is a schematic diagram of the apparatus of FIG. 1.

More specifically, as shown in FIG. 2, the radiation source means 12 can comprise a dye laser shown generally at 24 adapted to be excited by energy from flash lamp 26 or from a pulsed nitrogen laser, a frequency doubled, pulsed ruby laser or the like. Such dye laser 24 includes (1) a cell 28 containing dye material and (2) a laser cavity comprised of a partially transmitting output mirror 30 and an optical element 32 for generating laser radiation. The dye materials which are suitable for use in the dye laser 24 are any of those conventionally employed which, when excited, emit light having frequencies in the transparency range of the gaseous material being analyzed. Typical dye materials include Rhodamine 6G, Kiton Red, Cresyl Violet, Nile Blue and the like.

Radiation emitted from the dye material in dye cell 28 is continuously tunable over a wide frequency range. A tuning means 14 associated with the dye cavity 24 separates the radiation into a pair of coherent beams of monochromatic radiation $\omega_1$, $\omega_2$, which are transmitted from the radiation source means 12 via output mirror 30. Generation of the detectable signal 22 is most efficient when the radiation emitted from the dye laser 24 has a line width and frequency stability about equal to or less than the line width of the rotational spectral component of the gas appointed for detection.

The tuning means 14 can include a varying number of optical components assembled in a variety of combinations. In one embodiment of the apparatus 10, the tuning means 14 comprises a beam splitting means 34 for separating radiation from dye cell 28 into a pair of radiation beams $\omega_1$, $\omega_2$ and a pair of diffraction gratings 36, 38 mounted in autocollimation. The two diffraction gratings 36, 38 function in the manner of a conventional back mirror and, in addition, restrict the frequency range of the radiation beams so as to produce within cavity 24 a pair of coherent beams of monochromatic radiation having narrow line widths. A beam expanding telescope 29 can, optionally, be disposed in series with and between dye cell 28 and beam splitting means 34 for enlarging the width of the beams and improving the efficiency of the gratings. The tuning means 14 can additionally comprise a pair of etalons 40, 42, disposed in series with and between the beam splitting means 34 and diffraction gratings 36, 38, for further restricting the frequency of the radiation beams. Diffraction grating 36 is connected through shaft encoded stepping motor 44 to a wavelength tuning control means 48 adapted to vary the rotational velocity of stepping motor 44. Radiation beams $\omega_1$, $\omega_2$ are tuned by rotating the diffraction grating 36 so that the frequency difference therebetween equals substantially the rotational frequency of a preselected constituent of gaseous material. An electrical signal from the wavelength tuning control means 48 is directed into a recording means 66 for indicating the wavelength of the dye laser 24.

A projecting means comprising mirror 50 is associated with the dye laser 24. The projecting means introduces the two coherent beams of monochromatic radiation 15, 17 into gaseous material in sample compartment 52 in one direction, which will be considered to be substantially vertical for convenience in referencing directions but may, of course, be in any direction desired. A pressure wave resulting from increased molecular energy of a preselected species of the gaseous material in sample compartment 52 is detected by acoustical detecting means 23 disposed in wall 56 of compartment 52 so as to be in contact with the gaseous material therein.

Several known acoustical detecting means may be used with the apparatus 10. Preferably, the acoustical detecting means 23 is a microphone adapted to contact the gaseous material in sample 52 and transmit an electrical signal, the magnitude of which varies in proportion to pressure changes produced in the gaseous material by the radiation beams 15, 17. The signal 22 from microphone 23, typically in the audio frequency range, is amplified by amplifier 60 and transmitted to an integrator 62 which accumulates and adds the amplified signal 24 over some predetermined time interval. The output of integrator 62 is applied to recorder 66, which indicates the magnitude thereof.

Before describing how the apparatus of FIG. 2 can be used to determine the magnitude of signal 22, it would be helpful to explain the principles underlying photoacoustic rotational Raman spectroscopy. If a gaseous sample is illuminated by two laser beams, which are temporally and spatially coincident, interactions can occur which produce selective population of a given energy level of the sample. The conditions for which this selective population occurs are: (1) the transition involving the given energy level must be Raman-active, i.e., the transition must involve a change in the molecular polarizability, and (2) the frequency difference of the two incident laser beams must be adjusted to equal the frequency of this Raman-active transition. Raman-active transitions can occur for molecules that have no infrared spectrum, since the occurrence of a Raman spectrum depends on the change in polarizability of the molecule and not on the presence of a permanent dipole moment. The selective population of a given energy level is accomplished by the mechanism of coherent Raman amplification, which is the nonlinear optical process associated with stimulated Raman scattering. As the excited molecules in this energy level relax through collisions, a pressure wave is generated which is detected by a sensitive microphone.

Figure 3:
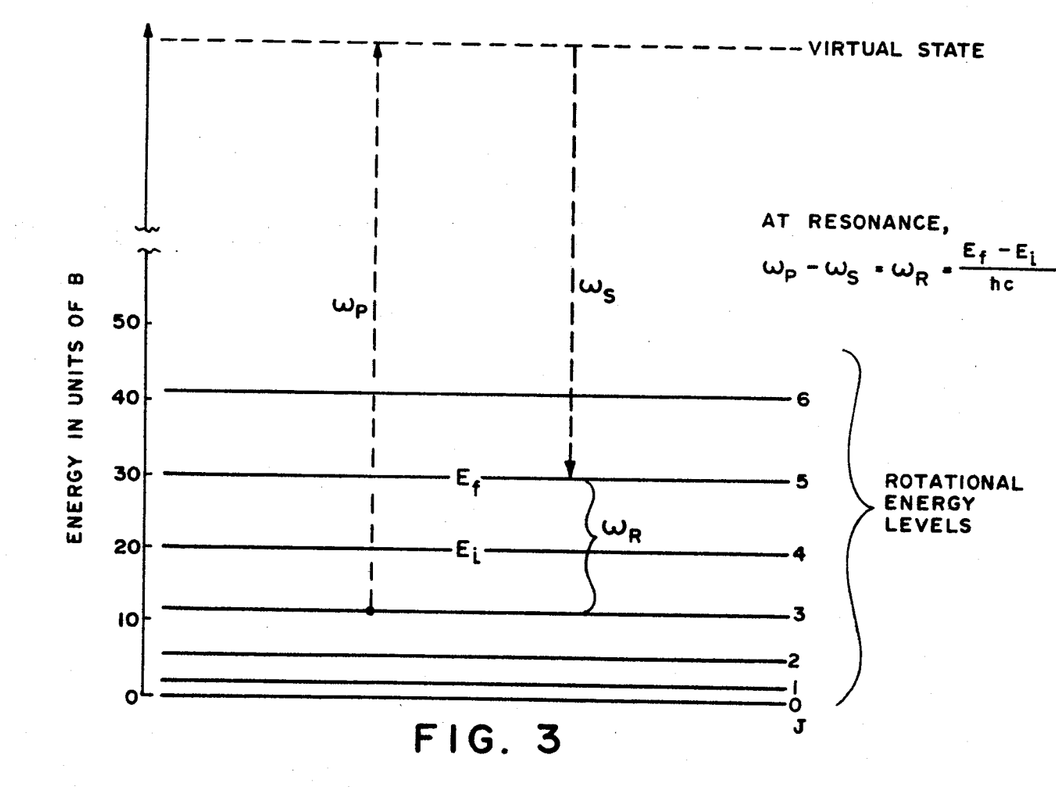
FIG. 3 is a schematic representation of the photoacoustic Raman scattering process illustrating rotational energy levels of a preselected molecular species.

A schematic representation of the photoacoustic Raman scattering process is shown in FIG. 3. Two incident laser beams with wavenumber frequency $\omega_p$ and $\omega_s$ interact with two energy states (labelled i and f) of a molecule. The laser beam at the frequency $\omega_p$ is referred to as the pump beam and the second laser beam at the frequency $\omega_s$ is referred to as the Stokes beam. If $E_i$ and $E_f$ are the energies (in units of ergs) associated with the levels i and f, then the wavenumber frequency, $\omega_p - \omega_s =$ for the Raman transition between those energy states is equal to $(E_f - E_i)/hc$, where h is Planck's constant $(6.626 \times 10^{-27}$ erg sec) and c is the speed of light ($\sim 3 \times 10^{10}$ cm/sec). If levels i and f are rotational energy levels of the molecule, then $(E_f - E_i)/hc = \omega_R$ is a rotational Raman frequency. When the frequencies of the incident lasers are adjusted such that $\omega_p - \omega_s = \omega_R$, the nonlinear interaction between the $\omega_p$ and $\omega_s$ beams, by means of the third-order nonlinear susceptibility $\chi^{(3)}(\omega_s)$, produces an amplification of the Stokes beam and an attenuation of the pump beam. For each Stokes photon which is generated by this interaction, one molecule is transferred from level i to level f. An excess population in level f is produced and the translational energy of the molecules in the gas sample is increased by collisional deactivation of the excess population in level f. This increase in the molecular translational energy produces a pressure change which is detected by a microphone in (or attached to) the gas sample cell.

$E_p$, $I_p$ and $E_s$, $I_s$ represent the electric field and intensity (power/unit area) for the collinear pump and Stokes beam, respectively, which are propagating in the positive Z direction through the gas sample. The temporal and spatial variations of the electric field for the Stokes beam only (in the absence of the pump beam) is $$E_s = \tilde{E}_s \exp[i(\omega_s t - k_s Z)] \tag{1}$$

where $\tilde{E}_s$ is the electric field amplitude and $k_s$ is the magnitude of the Stokes wavevector. When the pump beam is present simultaneously with the Stokes beam, a nonlinear interaction occurs which modifies the Stokes wavevector by the addition of a second term as shown below $$k_s' = k_s[1 + \frac{\chi^{(3)}(\omega_s)}{2\mu_s^2} |\tilde{E}_p|^2] \tag{2}$$

$$= k_s[1 + \frac{|\tilde{E}_p|^2}{2\mu_s^2}(\chi' - i\chi'')]$$

where $\mu_s$ is the refractive index at $\omega_s$ and $\chi^{(3)}(\omega_s)$ is the third-order nonlinear susceptibility at the Stokes frequency $\omega_s$. The susceptibility $\chi^{(3)}(\omega_s)$ is a complex quantity which is the sum of a resonant part, etc.

$$\chi^{(3)}(\omega_s) = (\chi' - i\chi'')_{RES} + \chi_{NR} \tag{3}$$

$$= \frac{N\Delta_R}{8\pi^4 hc\omega_s^4}\left[\frac{d\sigma}{d\Omega}\right] \frac{\omega_R}{\omega_R^2 - (\omega_p - \omega_s)^2 + i\Gamma(\omega_p - \omega_s)}$$
$$+ \chi_{NR}$$

where the subscripts RES and NR represent the resonant and nonresonant components, respectively. The nonresonant component $\chi_{NR}$ is a real quantity which is due to the electronic contribution to the susceptibility. Usually, $\chi_{NR}$ is several orders of magnitude smaller than the resonant susceptibility for strong Raman transitions in pure materials. At resonance, the frequency difference between the pump and Stokes beams obeys the relation $\omega_p - \omega_s = \omega_R$ and the real part of $\chi^{(3)}$ is equal to $\chi_{NR}$ only since $\chi' = 0$ and the imaginary part is equal to $$\chi'' = -\left[\frac{d\sigma}{d\Omega}\right] \frac{N\Delta_R}{8\pi^4 hc\omega_s^4 \Gamma} \tag{4}$$

where (p1 N'the molecular number density (p1 $\Delta_R =$ the fractional population difference between levels i and f
  ($d\sigma/d\Omega$) = the spontaneous Raman scattering cross-section $\Gamma =$ the full width at half maximum Raman linewidth in units of cm$^{-1}$ and
  $\omega_s =$ the frequency of the Stokes beam in units of cm$^{-1}$.

The electric field of the Stokes wave after having travelled a distance Z through the gas sample is $E_s'(Z)$ which is given by the equation $$E_s'(Z) = \tilde{E}_s \exp[i(\omega_s t - k_s' Z)] \tag{5}$$

$$= \tilde{E}_s'(Z) \exp[i(\omega_s t - k_s Z - k_s \frac{|\tilde{E}_p|^2}{2\mu_s^2} \chi' Z)]$$

where $$\tilde{E}_s'(Z) = \tilde{E}_s \exp[-k_s \frac{|\tilde{E}_p|^2}{2\mu_s^2} \chi'' Z]. \tag{6}$$

Since the relationship between the intensity (power per unit area) and the electric field amplitude of a light wave is given by the equation $I = c|\tilde{E}|^2/8\pi$, the term $$\exp[-ik_s \frac{|\tilde{E}_p|^2}{2\mu_s^2} \chi' Z]$$

gives rise to a spatial modulation of the refractive index of the gas sample, the magnitude of which depends on the intensity of the pump beam. The intensity of the amplified Stokes wave after traversing a distance Z through the gas sample is $$I_s(Z) = \frac{c}{8\pi} |\tilde{E}_s'|^2. \tag{7}$$

Using equation 6, equation 7 can be written in the form $$I_s(Z) = I_s(O) e^{g(\omega_s)Z} \tag{8}$$

where $I_s(O)$ is the initial intensity of the Stokes beam (at $Z = 0$) and $g(\omega_s)$ is the gain coefficient (in units of 1/cm) at the Stokes frequency given by the equation $$g(\omega_s) = -k_s \frac{|\tilde{E}_p|^2}{\mu_s^2} \chi''. \tag{9}$$

Substituting for $k_s (= 2\pi\mu_s\omega_s)$, $|\tilde{E}_p|^2$ and $\chi''$ yields $$g(\omega_s) = \frac{2N\Delta_R I_p}{hc^2\pi^2\mu_s\omega_s^3\Gamma}\left[\frac{d\sigma}{d\Omega}\right] \quad (10)$$

where $I_p$ is the pump intensity in units of ergs/sec/cm². The amplified Stokes intensity is $$I_s = I_s(Z) - I_s(0) = I_s(0)[e^{g(\omega_s)Z} - 1]. \quad (11)$$

The total energy in the amplified Stokes wave is $$E_s = \Delta I_s A_s T = \Delta n_s(hc\omega_s) \quad (12)$$

where
  $A_s$ = the cross-sectional area of the amplified Stokes beam
  $T$ = the interaction time of the pump and Stokes beams
  $\Delta n_s$ = the number of Stokes photons produced by the amplification process and
  $hc\omega_s$ = the energy of a single Stokes photon at frequency $\omega_s$.

Since, for each Stokes photon which is generated by the amplification process, one molecule is deposited in level f, we have $\Delta n_s = \Delta n_f$ where $\Delta n_f$ is equal to the increase in the number of molecules in level f produced by the Stokes amplification process. Therefore, $\Delta n_f$ may be written as $$\Delta n_f = \frac{\Delta I_s A_s T}{hc\omega_s}. \quad (13)$$

For low-to-moderate pump intensities ($I_p$), the exponential gain factor $g(\omega_s)$ in equation (11) will be small and we can use the approximation $e^x \approx 1+x$ for $x<<1$. Therefore, equation (11) may be written as $$\Delta I_s = g(\omega_s)ZI_s(0). \quad (14)$$

Combining equations (13) and (14) and expressing the Stokes laser intensity in units of W/cm², we obtain $$\Delta n_f = 5.03 \times 10^{22} A_s g(\omega_s) Z I_s(0) T/\omega_s. \quad (15)$$

Equation (15) permits us to calculate directly the increase in the number of molecules in level f induced by the interaction of the $\omega_p$ and $\omega_s$ laser beams. The quantity, $\Delta n_f$, is directly proportional to $g(\omega_s)$ which, in turn [equation 9], is proportional to only the imaginary part of the third order nonlinear susceptibility. Because of this, there is no contribution by the real nonresonant susceptibility to the PARS signal. As a result, the PARS technique should be useful for trace analysis in mixtures.

The excess number of molecules in level f, $\Delta n_f$, collide with other molecules in the gas and with the cell walls and, in this process, their energy ($hc\omega_R$) is converted into translational energy and these molecules return to level i. As a result of these collisions, the internal energy, U, of the gas is increased by an amount $\Delta U$ viz, $$\Delta U = \Delta n_f hc\omega_R \quad (16)$$

where $hc\omega_R$ is the energy of one rotational quantum associated with level f. Using the gas law $PV = (\gamma-1)U$ where $\gamma$ is the ratio of the specific heat at constant pressure to that at constant volume, the pressure change produced by the change in internal energy is $$\Delta P = (\gamma-1)\Delta U/V \quad (17a)$$

or $$\Delta P = [(\gamma-1)\Delta n_f hc\omega_R]/V \quad (17b)$$

where the pressure change, $\Delta P$, is in units of dynes/cm² when $\Delta U$ and V are expressed in units of ergs and cm³, respectively.

The acoustic energy, $E_A$, generated by the pressure change $\Delta P$ is equal to $V\Delta P$. Combining equations (17b) and (13) yields $$E_A = (\gamma-1)(\omega_R/\omega_s)\Delta I_s A_s T. \quad (18)$$

The acoustic power, $P_A$, is equal to $E_A/T$, i.e., $$P_A = (\gamma-1)(\omega_R/\omega_s)\Delta I_s A_s. \quad (19)$$

If the $\omega_p$ and $\omega_s$ laser beams have the same beam parameters (diameter and divergence angles) such that they can be exactly superimposed, then the acoustic power, $P_A$, may be written as $$P_A = (\gamma-1)(\omega_R/\omega_s)\Delta P_s \quad (20)$$

where $$\Delta P_s = P_s(0)[e^{g(\omega_s)Z} - 1] \quad (21)$$

and $P_s(0)$ is the total incident Stokes power. From equation (14), $$\Delta P_s \approx g(\omega_s)ZP_s(0) \quad (22)$$

for low-to-moderate pump intensities.

For most molecular species, the Raman frequency shifts, $\omega_p - \omega_s = \omega_R$, for pure rotational transitions are in the range 0–100 cm⁻¹, whereas, the vibrational Raman shifts, $\omega_p - \omega_s = \omega_V$, usually occur between 500 and 3200 cm⁻¹. Because of the smaller tuning range, it is possible to excite the rotational lines of all molecules using a single dye laser.

The rotational term value, F(J), is a quantity which specifies the positions of the rotational energy levels in a gas. It is given by the equation $$F(J) = BJ(J+1) \quad (23)$$

where B is the rotational constant and J is the rotational quantum number associated with the level F(J). The rotational constant, B, can be expressed in terms of the molecular moment of inertia, I, as $$B = h/(8\pi^2 cI). \quad (24)$$

Values of B for a few typical molecules are: $B(O_2) = 1.44$ cm⁻¹; $B(N_2) = 1.99$ cm⁻¹; $B(CO_2) = 0.39$ cm⁻¹; $B(N_2O) = 0.41$ cm⁻¹; etc. In equation (23) we assume that the molecules are rigid rotators and that centrifugal distortion effects are negligible. The selection rule for the change in rotational quantum number J for diatomic and some polyatomic molecules is $$\Delta J = 0, \pm 2. \quad (25)$$

For $\Delta J = +2$, the lines are referred to as S-branch lines and the rotational Raman shift, $\omega_p - \omega_s = \omega_R$, is equal to $$\omega_R = F(J + 2) - F(J) \quad (26)$$
$$= 4B(J + 3/2).$$

The acoustic energy [equation (18)] is proportional to the frequency ratio $\omega_R/\omega_s$ and to the Stokes gain coefficient $g_s$. The gain coefficient, $g_s$, is in turn proportional to the rotational Raman differential cross-section $(d\sigma/d\Omega)$ and to the inverse of the spontaneous Raman linewidth $(\Gamma^{-1})$. For typical rotational Raman transitions, $\omega_R/\omega_s$ will be a small quantity, however, both the Raman cross-section and $\Gamma^{-1}$ will be significantly larger for rotational scattering in comparison to vibrational Raman scattering. Therefore, rotational PARS signals should be of the same magnitude or perhaps even larger than vibrational PARS signals for a given molecular species.

For collinear beams propagating in the same direction, the Doppler width is a minimum and it is given by the equation $$\Delta\omega_D = \frac{2}{c}(2\ln 2 \cdot RT/M)^{\frac{1}{2}} \cdot \omega_R \quad (27)$$
$$= 7.1623 \times 10^{-7} \omega_R (T/M)^{\frac{1}{2}}$$

where R is the gas constant and M is the molecular weight. Since the quantity $\omega_R$ is small for rotational transitions in many gases, very high resolution rotational PARS spectra will be attainable by use of collinear excitation of the gas sample. For example, the Doppler width in $CO_2$ gas at a temperature of 300 K is $\Delta\omega_D = 1.8 \times 10^{-6} \omega_R$. For a $CO_2$ rotational line at $\sim 60$ cm$^{-1}$, the calculated Doppler width is $1.1 \times 10^{-4}$ cm$^{-1}$ or 3.4 MHz. Therefore, by use of very narrow bandwidth laser sources, it will be possible to use the rotational PARS technique for highly accurate spectroscopic identification. Spectral interferences due to overlapping lines should pose no problem, since the interfering lines would have to lie within $\sim 3$–5 MHz of the line to be detected. The probability of this occurring is very small. If such an interference does occur, then one would select a different rotational line for detection.

The rotational constants for most molecules are known to a high degree of accuracy (either from microwave spectroscopic data or from conventional high resolution Raman spectroscopy). Therefore, it is possible to predict the spectral positions of the rotational Raman lines very accurately. Positive identification of molecular species in a mixture is possible by comparing the experimental and the computer line positions. The rotational PARS technique should be very useful for quantitative analytical measurements of gas mixtures.

Figure 4:
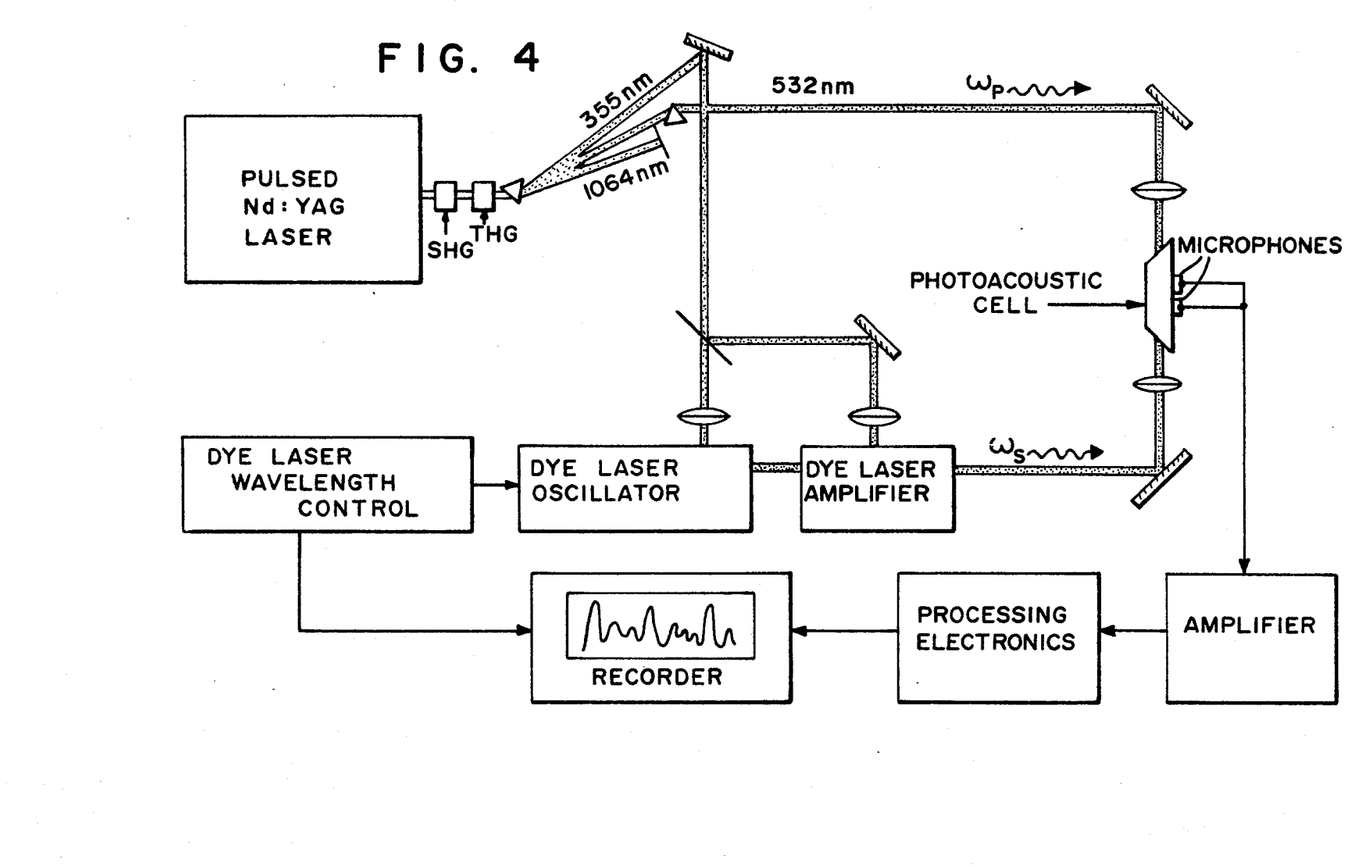
FIG. 4 is a schematic diagram of an alternate embodiment of the apparatus of FIG. 1.

Experiments demonstrating the rotational PARS technique have been conducted using nearly collinear beams at $\omega_p$ and $\omega_s$ propagating in the same direction as shown in FIG. 2 and with counter-propagating collinear beams in the arrangement shown schematically in FIG. 4. In the experimental arrangement of FIG. 4, a high power pulsed Nd:YAG laser is the primary source of coherent radiation for the experiment. This laser, which is capable of generating 70 MW, 10 nsec pulses at 1.06$\mu$, is operated with second and third harmonic generators to produce 20 MW and 10 MW at 532 nm and 355 nm, respectively. A prism is used to spatially separate the harmonics of this laser and mirrors and/or prisms are used to direct the second and third harmonic beams to various locations on the optical table. The 355 nm beam is split into two or three beams for pumping a dye laser oscillator and amplifier stage(s). The dye oscillator, which is pumped transversely by the 355 nm beam, consists of a magnetically stirred dye cuvette, a beam expanding telescope, and a stepping motor controlled diffraction grating. An intracavity solid Fabry-Perot etalon may also be employed in this laser when higher resolution is required. The dye laser output beam is amplified by passing through a second transversely pumped dye cuvette. Further amplification is achieved by use of a longitudinally pumped flowing dye amplifier cell. This dye laser/amplifier system typically produces 0.3–0.5 MW pulses which are tunable in frequency and which have linewidths on the order of 0.5 to 1.0 cm$^{-1}$. The dye laser ($\omega_s$) beam is focused in the photoacoustic gas cell using a 15 cm focal length lens. As shown in FIG. 4, the pump beam and dye laser beam are counter-propagating through the photoacoustic cell. This counter-propagating beam arrangement is only possible because phasematching is not required for the PARS process. The electrical signal from the microphone in the photoacoustic cell is amplified and then analyzed by a boxcar signal averager. The output from the boxcar is displayed on a chart recorder. A spectrum is generated by recording the boxcar output while changing the frequency difference ($\omega_p - \omega_s$) by scanning the frequency of the dye laser.

Figure 5:
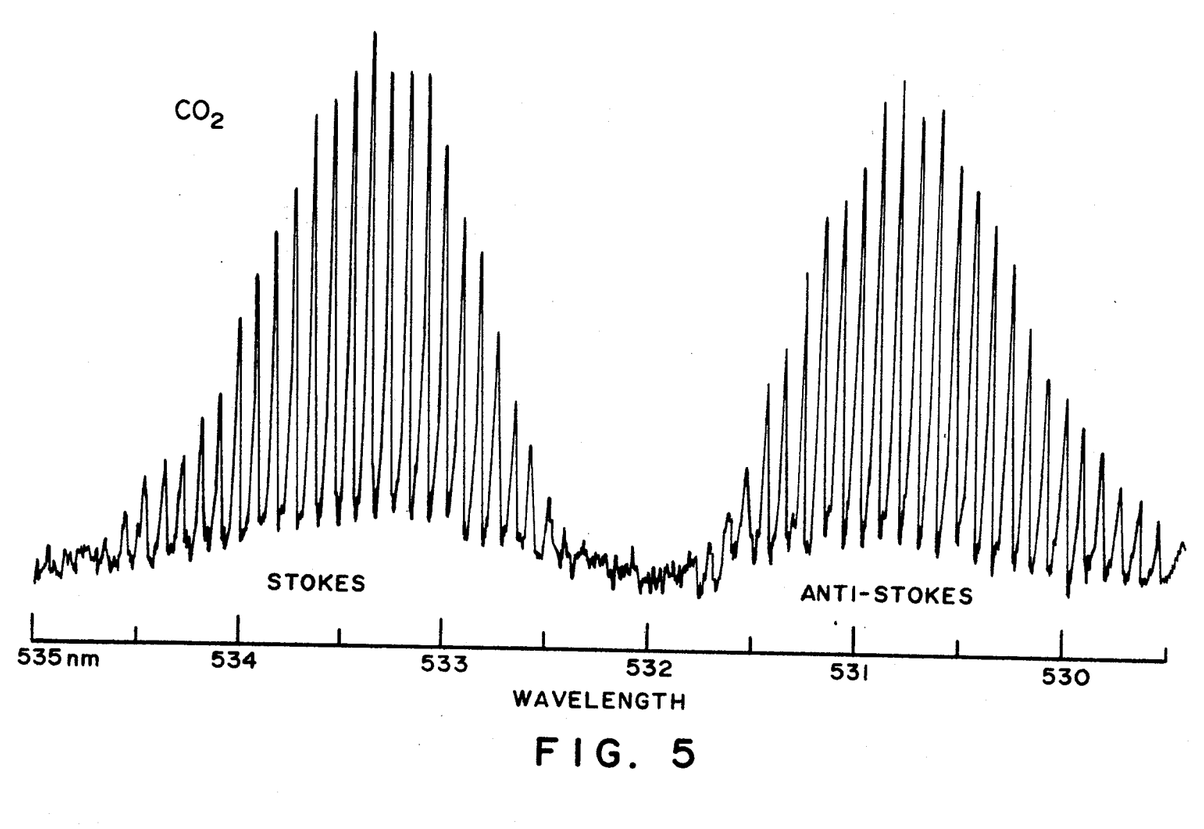
FIG. 5 depicts the rotational photoacoustic Raman spectrum of $CO_2$ gas.
Figure 6:
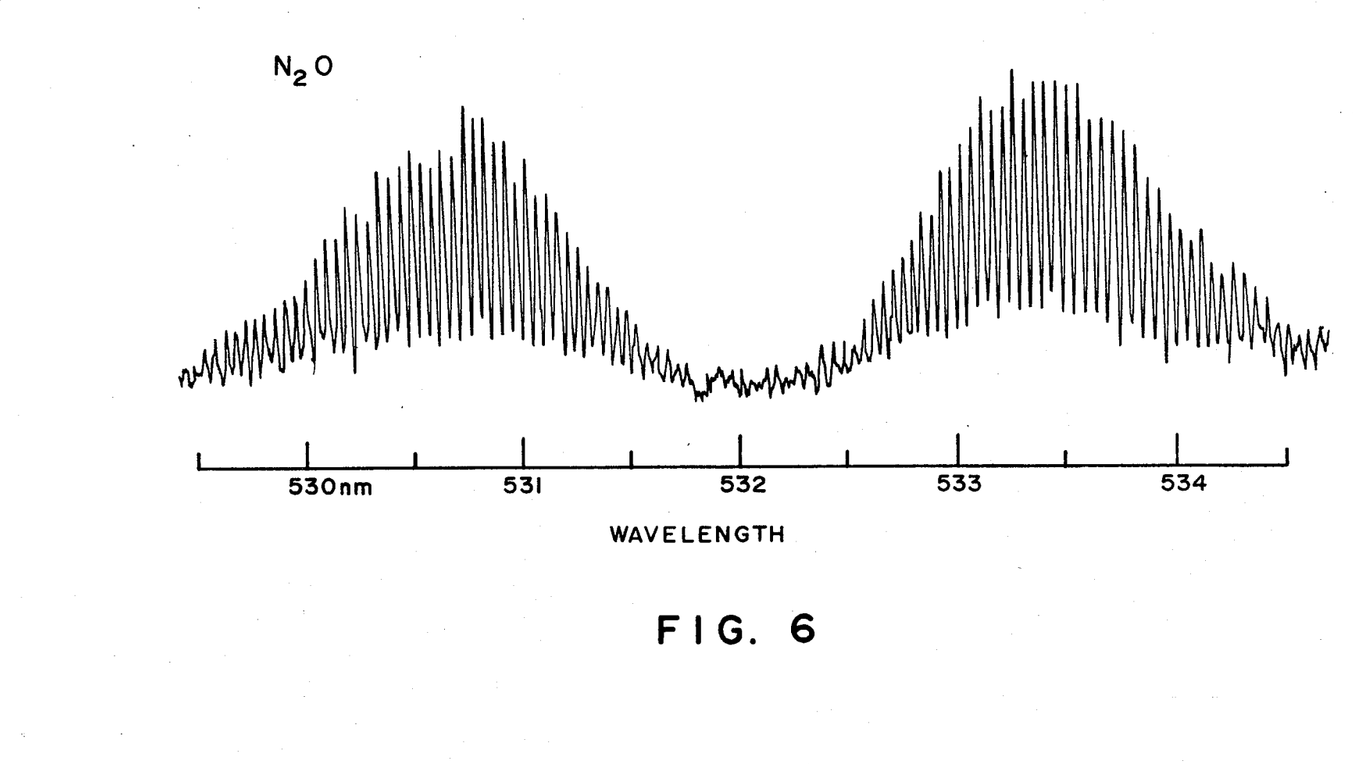
FIG. 6 depicts the rotational photoacoustic Raman spectrum of $N_2O$ gas.

A typical rotational photoacoustic Raman spectrum is shown in FIG. 5. This is a spectrum of $CO_2$ gas at a pressure of 600 torr. The pump wavelength was 532 nm (second harmonic of 1.06$\mu$) and the pump peak power was measured to be 3.3 MW. The dye laser peak power was about 120 kW. The rotational line spacing is about 3.1 cm$^{-1}$. A similar pure rotational PARS spectrum for $N_2O$ gas is shown in FIG. 6. For this spectrum, the peak pump power (at 532 nm) was 3.4 MW and the dye laser peak power was approximately 60 kW. The $N_2O$ gas pressure was 500 torr. In $N_2O$, the rotational line separation is about 1.6 cm$^{-1}$.

A calibrating means shown generally at 68 including beam splitting means 70, reference gas cell 72 and detecting and recording means 74 can, optionally, be associated with the apparatus 10 for providing a reference signal 76 derived from a reference gas of the type being analyzed. The beam splitting means 70 is adapted to direct a portion of radiation beams 15, 17 through the reference gas, which is contained in cell 72. Pressure waves produced in reference gas cell 72 are processed by detecting means 74, which is constructed and operated in the same manner as detecting means 24. The output of the detecting means 74 represents the magnitude of the reference pressure wave signal 76 for a known concentration of reference gas. Such output signal can be compared with the output signal of detecting means 24 to determine the concentration of gas in sample compartment 52. Other similar modifications can be made which fall within the scope of the present invention. It is, accordingly, intended that all matter contained in the above description and shown in the accompanying drawings be interpreted as illustrative and not in a limiting sense.

In operation of the preferred apparatus, radiation source means 12 generates two coherent beams 15, 17 of monochromatic radiation. The frequency difference between the radiation beams 15, 17 is adjusted by tuning means 14 to equal substantially the rotational frequency of a preselected constituent of gaseous material. Projecting means 16 directs the radiation beams 15, 17 through the gaseous material to produce scattered radiation 20 containing a detectable signal 22 in the form of a pressure wave. A detecting means 24 measures the pressure wave and indicates the magnitude of the detectable signal 22.

Having thus described the invention in rather full detail, it will be understood that these details need not be strictly adhered to but that various changes and modifications may suggest themselves to one skilled in the art, all falling within the scope of the present invention as defined by the subjoined claims.

I claim:
1. Apparatus for analyzing material, comprising:
   a. radiation source means for generating two coherent beams of monochromatic light;
   b. tuning means for adjusting the frequency difference between said beams of radiation to equal substantially the rotational frequency of a preselected constituent of said material;
   c. projecting means for detecting said beams of light through said material to increase molecular energy of a preselected species of said material and thereby produce a detectable signal in the form of a pressure wave;
   d. detecting means for indicating the magnitude of said signal.
2. Apparatus as recited in claim 1, wherein said tuning means is adjusted to selectively populate a higher energy level of said preselected molecular species.
3. Apparatus as recited in claim 1, wherein said projecting means is adjusted to effect spatial and temporal overlap between said radiation beams.
4. Apparatus as recited in claim 1, wherein said radiation source means comprises a dye laser including a dye cell containing a dye material, means for exciting said dye and a laser cavity comprised of an optical element and a partially transmitting output mirror for generating and transmitting laser radiation.
5. Apparatus as recited in claim 4, wherein said dye material emits radiation upon being excited, said radiation having frequencies within the transparency range of said gaseous material.
6. Apparatus as recited in claim 1, wherein said tuning means comprises beam splitting means for separating said radiation into a pair of radiation beams, and a pair of diffraction gratings mounted in autocollimation.
7. Apparatus as recited in claim 1, wherein said radiation source means includes a fixed frequency laser adapted to produce said first radiation beam and a dye laser adapted to be pumped by said fixed frequency laser to produce said second radiation beam.
8. Apparatus as recited in claim 1, wherein said first and second beams are propagating in the same direction.
9. Apparatus as recited in claim 1, wherein said first and second beams are counter-propagating and colinear.
10. A method for spectroscopically analyzing material comprising the steps of:
    a. generating two coherent beams of monochromatic radiation;
    b. adjusting the frequency difference between the beams of radiation to equal substantially the rotational frequency of a preselected constituent of said material;
    c. directing the beams of radiation through the material to produce a detectable signal in the form of a pressure wave; and
    d. indicating the intensity of said signal.
11. In a method for spectroscopic analysis of gaseous material wherein a constituent to be detected has at least one Raman frequency shift for pure rotational transition not greater than 100 cm$^{-1}$, comprising steps of generating, by laser action, two coherent beams of monochromatic radiation; adjusting the frequency difference between the beams of radiation to equal substantially the said Raman frequency shift of the said constituent to be detected; and projecting the beams into the gaseous material in at least approximately the same direction: the improvements which comprise focusing said beams so that they are nearly collinear when passing through said gaseous material and employing beams having narrow linewidths thereby obtaining, at high resolution, at least one signal in the form of a pressure wave, in said gaseous material, having acoustic energy approximately proportional to said Raman frequency shift and Doppler width approximately proportional to said Raman frequency shift; and acoustically detecting said signal.
12. Method of claim 11 wherein the acoustical detection is effected by means of a microphone contacting the gaseous material.
13. Method of claim 11 wherein a constituent to be detected in the gaseous material is carbon dioxide.
14. Method of claim 11 wherein a constituent to be detected in the gaseous material is nitrous oxide.

* * * * *

UNITED STATES PATENT AND TRADEMARK OFFICE
CERTIFICATE OF CORRECTION

PATENT NO. : 4,270,864

DATED : June 2, 1981

INVENTOR(S) : Joseph J. Barrett et al.

It is certified that error appears in the above—identified patent and that said Letters Patent is hereby corrected as shown below:

Column 11, line 23, "detecting" should read -- directing --.

Signed and Sealed this

Fifteenth Day of September 1981

[SEAL]

Attest:

Attesting Officer

GERALD J. MOSSINGHOFF

Commissioner of Patents and Trademarks